(12) United States Patent
Zhou

(10) Patent No.: US 12,501,114 B2
(45) Date of Patent: Dec. 16, 2025

(54) VIDEO PROCESSING METHOD AND APPARATUS, AND DEVICE

(71) Applicant: Beijing Bytedance Network Technology Co., Ltd., Beijing (CN)

(72) Inventor: Xubin Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 18/704,806

(22) PCT Filed: Sep. 21, 2022

(86) PCT No.: PCT/CN2022/120161
§ 371 (c)(1),
(2) Date: Apr. 25, 2024

(87) PCT Pub. No.: WO2023/071631
PCT Pub. Date: May 4, 2023

(65) Prior Publication Data
US 2024/0422395 A1    Dec. 19, 2024

(30) Foreign Application Priority Data
Oct. 25, 2021    (CN) .......................... 202111242583.5

(51) Int. Cl.
H04N 21/472    (2011.01)
(52) U.S. Cl.
CPC .............................. *H04N 21/47205* (2013.01)
(58) Field of Classification Search
CPC .............................................. H04N 21/47205
See application file for complete search history.

(56) References Cited

U.S. PATENT DOCUMENTS

| 11,301,131 B2 * | 4/2022 | Li .......................... G06F 9/451 |
| 11,651,471 B2 * | 5/2023 | Suzuki ................. H04N 23/698 |
| | | 345/647 |

(Continued)

FOREIGN PATENT DOCUMENTS

| CN | 105867779 A | 8/2016 |
| CN | 106937142 A | 7/2017 |

(Continued)

OTHER PUBLICATIONS

International Search Report and Written Opinion for PCT/CN2022/120161, mailed Dec. 12, 2022, 17 pages.

(Continued)

*Primary Examiner* — Mulugeta Mengesha
(74) *Attorney, Agent, or Firm* — Astute IP Law Group

(57) ABSTRACT

A video processing method and apparatus, and a device are provided. The method includes: obtaining a target video; splitting the target video, based on a display position of the target video, within a video display region to obtain a video block set, wherein the video block set includes a target number of first video blocks; determining the second video block from the video block set according to a video interaction type, wherein the second video block is displayed in a starting display region; determining a target display region from a region set to be displayed, wherein the region set to be displayed includes at least one region to be displayed, and the region to be displayed belongs to the video display region and is a minimum unit of a display region for displaying the second video block; and displaying the second video block within the target display region.

20 Claims, 8 Drawing Sheets

(56) References Cited

U.S. PATENT DOCUMENTS

| | | | | |
|---|---|---|---|---|
| 2015/0110469 A1* | 4/2015 | Ushiyama | .......... | H04N 21/4728 |
| | | | | 386/241 |
| 2017/0195650 A1 | 7/2017 | Liu | | |
| 2017/0205990 A1* | 7/2017 | Ma | ...................... | G06F 3/04817 |
| 2023/0353669 A1* | 11/2023 | Xu | ........................ | H04N 21/439 |
| 2025/0142159 A1* | 5/2025 | Yang | ................ | H04N 21/47217 |

FOREIGN PATENT DOCUMENTS

| | | |
|---|---|---|
| CN | 110045940 A | 7/2019 |
| CN | 111258519 A | 6/2020 |
| CN | 111556358 A | 8/2020 |
| CN | 112702561 A | 4/2021 |
| CN | 112770050 A | 5/2021 |
| CN | 112988021 A | 6/2021 |
| CN | 113891141 A | 1/2022 |
| CN | 113891141 B | 1/2024 |
| WO | 2017/211250 A1 | 12/2017 |
| WO | 2020/228406 A1 | 11/2020 |

OTHER PUBLICATIONS

Office Action for Chinese Patent Application No. 202111242583.5, mailed Jul. 17, 2023, 11 pages.

\* cited by examiner

VIDEO PROCESSING METHOD AND APPARATUS, AND DEVICE

CROSS REFERENCE TO RELATED APPLICATIONS

This application is a national filing of International Patent Application No. PCT/CN2022/120161, filed on Sep. 21, 2022, which claims the priority to and benefits of Chinese Patent Application No. 202111242583.5, entitled with "Video Processing Method and Apparatus, Device", filed on Oct. 25, 2021. All the aforementioned patent applications are hereby incorporated by reference in their entireties.

The present application claims priority of Chinese Patent Application No. 202111242583.5 entitled with "Video Processing Method and Apparatus, Device", filed on Oct. 25, 2021, the entire content disclosed by which is incorporated by reference in the present application.

TECHNICAL FIELD

The present application relates to the field of computer technology, and in particular, to a video processing method, an apparatus, and a device.

BACKGROUND

Video comprises continuous frames with a smooth continuous visual effect perceived by human eyes, obtained by processing images based on the principle of visual persistence. With the rapid development of the Internet technology, users can upload or view video over networks conveniently. Videos have become important media for transmitting information. Users may use an electronic device to play a video, and obtain related information from the video. The users may also use the electronic device to capture frames to generate a video and spread the video to other users so as to share information.

At present, the visual effect displayed during video playback is relatively simple, leading to poor experience for a user when viewing the video.

SUMMARY

In view of this, embodiment(s) of the present application provides a video processing method, an apparatus, and a device that can achieve visual effects of video interaction with users and improve the user's viewing experience.

Based on this, the technical scheme provided by the embodiment of the present application is as follows:

In the first aspect, an embodiment of the present application provides a video processing method, comprising:
  obtaining a target video;
  splitting the target video, based on a display position of the target video, within a video display region to obtain a video block set, wherein the video block set comprises a target number of first video blocks, the target number is at least two, and the video display region is a display region displaying the target video;
  determining a second video block from the video block set according to a video interaction type, wherein the second video block is displayed in a starting display region, and the starting display region belongs to the video display region;
  determining a target display region from a region set to be displayed, wherein the region set to be displayed comprises one or more regions to be displayed, and the region to be displayed belongs to the video display region and is a minimum unit of a display region for displaying the second video block; and
  displaying the second video block within the target display region.

In the second aspect, an embodiment of the present application provides a video processing apparatus, comprising:
  an obtaining unit, configured to obtain a target video;
  a splitting unit, configured to split the target video, based on a display position of the target video, within a video display region to obtain a video block set, wherein the video block set comprises a target number of first video blocks, the target number is at least two, and the video display region is a display region displaying the target video;
  a first determination unit, configured to determine a second video block from the video block set according to a video interaction type, wherein the second video block is displayed in a starting display region, and the starting display region belongs to the video display region;
  a second determination unit, configured to determine a target display region from a region set to be displayed, wherein the region set to be displayed comprises one or more regions to be displayed, and the region to be displayed belongs to the video display region and is a minimum unit of a display region for displaying the second video block; and
  a first display unit, configured to display the second video block within the target display region.

In the third aspect, an embodiment of the present application provides an electronic device, comprising:
  one or more processors; and
  a storage unit storing one or more programs,
  wherein the one or more programs, when executed by the one or more processors, cause the one or more processors to implement the video processing method according to any one of the embodiments in the first aspect.

In the fourth aspect, the embodiment of the present application provides a computer-readable medium, storing a computer program which, when executed by a processor, causes implementing the video processing method according to any one of the embodiments in the first aspect.

Thus, it can be seen that the embodiment of the application has the following beneficial effects:

The video processing method, apparatus and device provided by the embodiments of the present application. By obtaining a target video, and splitting the target video based on a display position of the target video in a video display region to obtain a video block set; wherein the video blocks include a target number of first video blocks; then a second video block is determined from the video block set according to the video interaction type, the second video block is displayed in a starting display region, and the target display region is determined in the region set to be displayed, and the second video block is displayed in the target display region. In this way, the display region can be adjusted from the second video block obtained by splitting the target video, which realize the movement of the display region of the second video block and enrich the visual effect of the video. The user can select the second video block and/or the target display region when the video is displayed, which realize flexible adjustment of the second video block and improve the user experience.

BRIEF DESCRIPTION OF THE DRAWINGS

In order to provide a clearer explanation of the embodiments or technical solutions in the present application or prior art, a brief introduction will be made to the accompanying drawings required in the embodiments or prior art description, and it is evident that the accompanying drawings in the following description are only some embodiments of the present application. For those skilled in the art, other accompanying drawings can be obtained based on these drawings without the need for creative labor.

DETAILED DESCRIPTION

In order to make the above objects, features and advantages of the present application more obvious and easier to understand, the embodiments of the present application will be further described in detail with the attached drawings and specific embodiments.

For ease of understanding and explaining of the technical scheme provided by the embodiment of the present application, the background technology of the present application will be explained first.

After studying the traditional video showing process, it has been found that a user can only control a display size and a playing mode of a video by means of a controller in a video play interface. The current video shows a single visual effect, which leads the user prone to feel bored when watching the video, and the user experience is poor.

On this basis, embodiments of the present application provide a video processing method, apparatus and device. By obtaining a target video, and splitting the target video based on a display position of the target video in a video display region to obtain a video block set; wherein the video blocks include a target number of first video blocks; then a second video block is determined from the video block set according to the video interaction type, the second video block is displayed in a starting display region, and the target display region is determined in the region set to be displayed, and the second video block is displayed in the target display region. In this way, the display region can be adjusted from the second video block obtained by splitting the target video, which realize the movement of the display region of the second video block and enrich the visual effect of the video. The user can select the second video block and/or the target display region when the video is displayed, which realize flexible adjustment of the second video block and improve the user experience.

Figure 1:
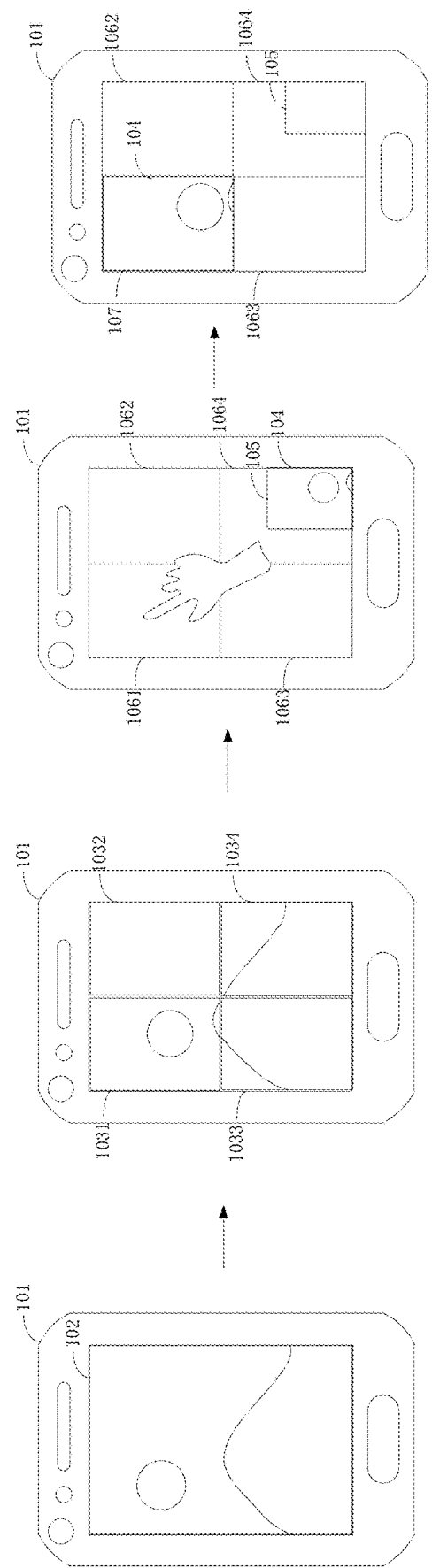
FIG. 1 is a schematic diagram of a framework of an exemplary application scenario provided in an embodiment of the present application.

For ease of understanding a video processing method provided in an embodiment of the present application, the video processing method is described by taking for example the scenario shown in FIG. 1. FIG. 1 is a schematic diagram of a framework of an exemplary use scenario provided in an embodiment of the present application.

In practical use, a terminal 101 displays a target video 102 for a user, and the user may select a video interaction type when viewing the target video 102. After obtaining the video interaction type selected by the user, the terminal 101 firstly obtains the target video 102 being displayed and split the target video 102 within a video display region, based on a display position of the target video 102, to obtain a video block set. The video block set comprises four first video blocks 1031-1034 generated after splitting the target video. A second video block 104 is determined from the first video blocks 1031-1034 according to the video interaction type selected by the user. The second video block 104 is displayed within a starting display region 105. The video display region further comprises regions 1061-1064 to be displayed. A target display region 107 is determined from the regions 1061-1064 to be displayed. For example, the region to be displayed selected and triggered by the user may be determined as the target display region 107. The target display region 107 is updated as the display region of the second video block 104, and the second video block 104 is displayed within the target display region 107.

A person skilled in the art will understand that the schematic diagram of the framework shown in FIG. 1 is merely an example in which the embodiment of the present application may be implemented. The applicable scope of the embodiment of the present application is not limited by any aspect of the framework.

Based on the above description, the video processing method provided in the present application will be described in detail below with reference to the accompanying drawings.

Firstly, it needs to be noted that the video processing method provided in the embodiment of the present application may be applied to a device with a video display function, such as a computer, a smart phone, and a Pad, and so on.

Figure 2:
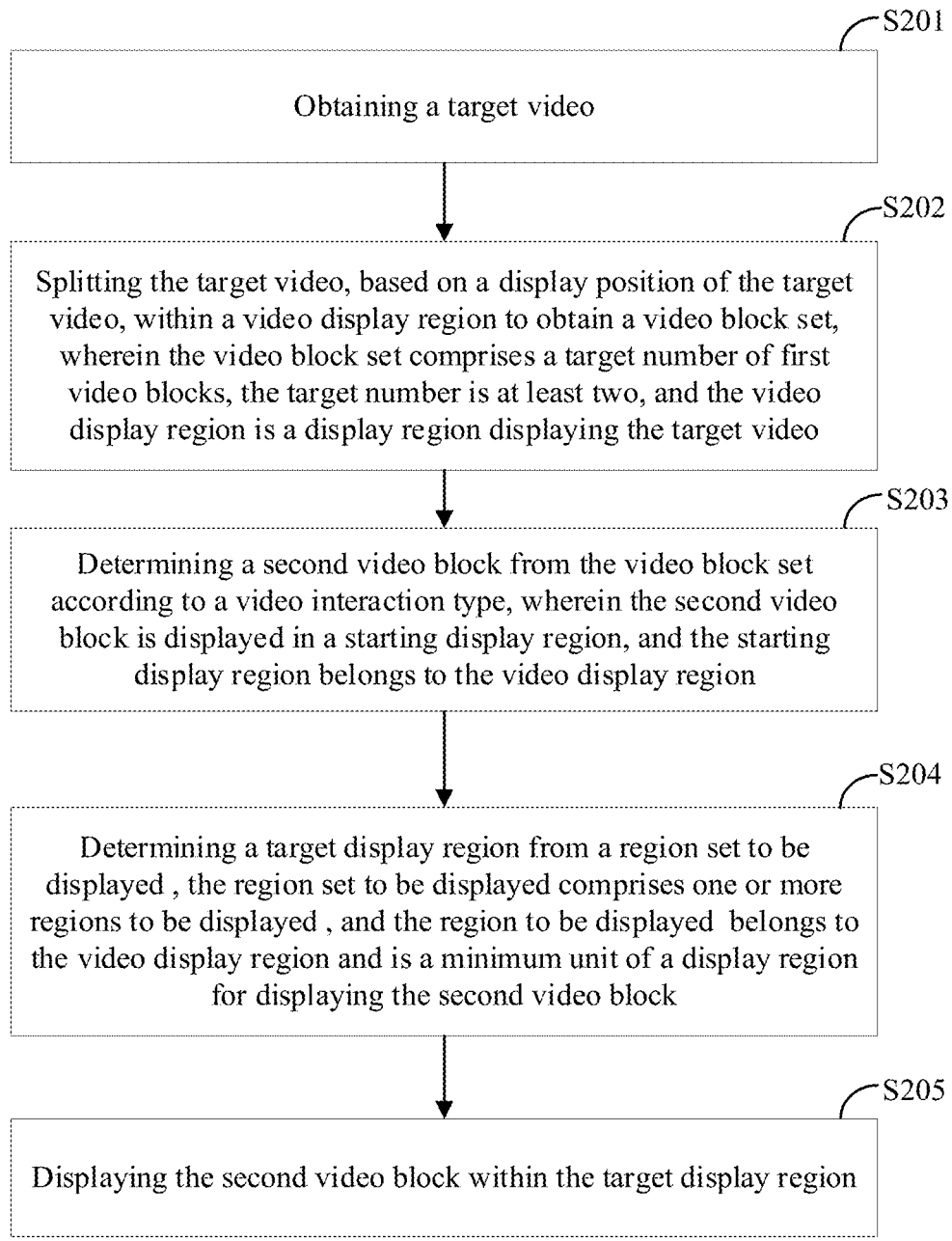
FIG. 2 is a schematic diagram of a flowchart of a video processing method provided in an embodiment of the present application.

FIG. 2 is a flowchart of a video processing method provided in an embodiment of the present application. As shown in FIG. 2, the video processing method may include steps S201-S205.

S201: obtaining a target video.

The target video is a video in need of visual effect processing. The target video may be a video being displayed or may be a video selected by a user for processing.

It needs to be noted that the target video in the embodiment of the present application may be a video shot in real time. The target video may be a video not generated in real time. The target video may also be an image. The image may be a single-frame video, and an image processing method is consistent with the video processing method, which will not be described in detail here.

The embodiment of the present application has no limitation on a trigger condition for obtaining the target video. In a possible implementation, the target video may be obtained after detecting that a video processing key is triggered by the user. If the video processing key is set in a video playing display page, the video being displayed may be obtained as the target video after detecting that the video processing key is triggered by the user. If the video processing key is set in a video selection page, a video triggered and selected by the user for playing may be determined as the target video after detecting that the video processing key is triggered by the user.

S202: splitting the target video, based on a display position of the target video, within a video display region to obtain a video block set, wherein the video block set comprises a target number of first video blocks, the target number is at least two, and the video display region is a display region displaying the target video.

The target video is displayed within the video display region on a display screen of the electronic device. The video display region is a region for displaying the target video in the display screen. For example, when the user selects to display video A, the video A is played in full screen, and the video display region is the entire region of the display screen. For another example, when the user selects to display video A, the video A is played in a small window, and the video display region is a region of the display screen that is occupied by the small playing window.

The target video may be split based on the display position of the target video within the video display region. After the target video is split, a target number of first video blocks may be generated. The first video blocks are minimum units forming the target video after splitting the target video. The first video blocks are videos of the target video that are displayed within corresponding split regions. Splitting the target video may not affect the normal display of the first video blocks after being split. The first video blocks obtained by splitting the same target video synchronously display video contents of corresponding split regions in the target video. All the first video blocks are displayed within the video display region according to a positional relationship of the split regions so as to form the complete target video. The target number of first video blocks are combined into the video block set.

Figure 3A:
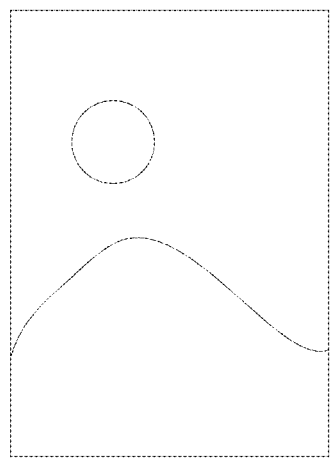
FIG. 3(a) is a schematic diagram of a target video provided in an embodiment of the present application.
Figure 3B:
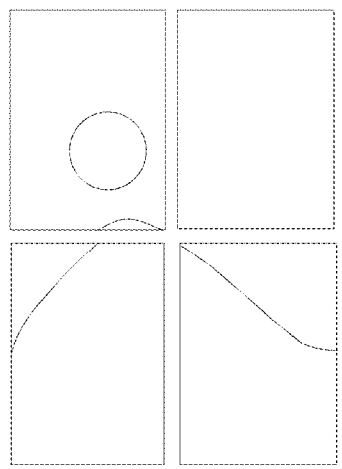
FIG. 3(b) is a schematic diagram of first video blocks provided in an embodiment of the present application.

A split manner of splitting the target video may be preset. The split manner used for splitting the target video may be preset. For example, the target video may be uniformly split into 3 rows and 3 columns based on the display position of the target video within the video display region to obtain the video block set including a total of 9 first video blocks. FIG. 3(a) is a schematic diagram of a target video provided in an embodiment of the present application. FIG. 3(b) is a schematic diagram of first video blocks provided in an embodiment of the present application. FIG. 3(b) shows the first video blocks obtained by splitting the target video in a uniform 2-row 2-column split manner. In addition, the split manner may be determined according to a split manner instruction triggered and generated by the user. For example, when the split manner selected by the user is uniform split into 2 rows and 2 columns, the target video is uniformly split into 2 rows and 2 columns to obtain the video block set including a total of 4 first video blocks.

The target number is decided by the split manner. The target number is at least two. Each video of the minimum unit obtained after split is the first video block. The video displayed by the first video block is not affected by the display region of the first block itself and is only related to the target video and a split region of the target video where the first video block is located. For example, the target video is uniformly split into left and right first video blocks according to the video display region, which are first video block A corresponding to the left split region and first video block B corresponding to the right split region, respectively. When the first video block A is displayed within the display region, the video content of the target video corresponding to the left split region may be displayed.

In a possible implementation, an embodiment of the present application provides a specific implementation of splitting the target video based on the display position of the target video within the video display region to obtain the video block set, which will be specifically described below.

In a case, the first video blocks obtained after split may be displayed within the video display region. The display region of each first video block is a split region of the first video block in the target video.

S203: determining a second video block from the video block set according to a video interaction type, wherein the second video block is displayed in a starting display region, and the starting display region belongs to the video display region.

The second video block is a video block selected from the target number of first video blocks included in the video block set and adjustable in display region. The video interaction type is used to indicate a manner of controlling the second video block to move. The video interaction type may be preset and may be determined according to an interactive instruction triggered by the user.

The second video block is determined from the first video blocks according to the video interaction type. The second video block may be one video block in the video block set and may also be a plurality of video blocks, which may be specifically determined according to the video interaction type. The manner of determining the second video block from the video block set is determined according to the video interaction type. The embodiments of the present application provide three video interaction types and provide corresponding specific implementations of determining the second video block from the video block set according to the video interaction types, which will be specifically described below.

The initial display region of the second video block within the video display region is the starting display region. Each starting display region is used to display one second video block. The starting display regions belong to the video display region and may also be minimum units of the display regions obtained after splitting the video display region. The starting display regions may be predetermined. The specific positions and number of the starting display regions may also be determined according to the video interaction types. It needs to be noted that the number of the starting display regions is greater than or equal to the number of second video blocks.

By displaying the second video blocks within the starting display regions, the user is allowed to specify the second video block to be moved and thus can move the second video block conveniently. The experience of the user in adjusting the second video block is enhanced.

S204: determining a target display region from a region set to be displayed, the region set to be displayed comprises one or more regions to be displayed, and the region to be displayed belongs to the video display region and is a minimum unit of a display region for displaying the second video block.

The video display region further comprises regions to be displayed. The region to be displayed is a display region that can be used to display the second video block. The regions to be displayed may be minimum units of the display regions obtained after splitting the video display region. It needs to be noted that the region to be displayed and the starting display region may be independent of each other. For example, different split manners may be adopted for the video display region to obtain different minimum units of the display regions, and then the regions to be displayed and the starting display region may be determined. The determined region to be displayed may overlap the starting display region. The regions to be displayed and the starting display region may also be different minimum units of the display regions obtained by splitting the video display region in a split manner. The region to be displayed may not overlap the starting display region and may be a region other than the starting display region in the video display region. The region to be displayed may be specifically determined based on the video interaction type and may also be determined based on a display instruction from the user.

The video display region may include one or more regions to be displayed, and each of the regions to be displayed is capable of correspondingly displaying one second video block. The regions to be displayed in the video display region form the region set to be displayed. The target display region is determined from the region set to be displayed. The target display region is a display region that is determined to display the second video block. The target display region may include one or more regions to be displayed. The number of regions to be displayed included in the target display region may be determined based on the number of second video blocks.

The embodiments of the present application have no limitation on the implementation of determining the target display region from the region set to be displayed. For example, the target display region may be determined according to a position selection instruction triggered by the user. For another example, the target display region may be determined according to the starting display region of the second video block.

The embodiments of the present application provide three video interaction types and provide three corresponding specific implementations of determining the target display region from the region set to be displayed, which will be specifically described below.

S205: displaying the second video block within the target display region.

After the target display region is determined, the target display region is the display region in which the second video block is currently displayed, and the second video block is displayed in the target display region.

It needs to be noted that the embodiments of the present application have no limitation on the manner of displaying the second video block in the target display region. For example, the second video block may be displayed in all the display regions of the target display region, and may also be displayed in part of the display regions of the target display region.

The embodiments of the present application have no limitation on a time of adjusting the second video block. In a possible implementation, the second video block may be displayed within the target display region when the second video block refreshes next image.

In a possible implementation, region coordinates corresponding to the display region of the second video block may be recorded. By setting the region coordinates of the display position of the second video block to the region coordinates of the target display region, the target display region is updated as the display region of the second video block.

Specifically, an original coordinate table may be established based on the video display region. The coordinates of the display region (i.e., the split region) of the video display region of each first video block corresponding to the video display region after splitting the target video are recorded in the original coordinate table. The coordinates of the display region may be coordinates of the position of a center point of the display region in the screen. When the boundary of the display region is rectangular, the coordinates of the display region may also be vertex coordinates of the boundary of the display region.

Moreover, a moving coordinate table may be further established. The moving coordinate table may be used to record the coordinates of the current display region of the second video block. After the second video block and the starting display region are determined, the coordinates of the display region corresponding to the second video block in the moving coordinate table are updated as the coordinates of the starting display region. Similarly, the coordinates of the starting display region may be coordinates of the position of the center point of the starting display region in the screen. After the target display region is determined, the coordinates of the display region corresponding to the second video block may be updated as the coordinates of the target display region. The second video block is then displayed based on the moving coordinate table.

From the related contents of S201-S205, a plurality of first video blocks may be obtained by splitting based on the display position of the target video, and the second video block may be selected based on the video interaction type. The target display region is then determined from the region set to be displayed, and the second video block is displayed within the target display region. Thus, the display region of the second video block may be flexibly adjusted based on the video interaction type. The visual effects of video displaying can be enriched; the interestingness of video displaying can be improved; and the user experience can be enhanced.

In a possible implementation, the second video block may be determined for a plurality of times, and the second video block may be moved. On this basis, an embodiment of the present application provides a video processing method. Apart from S201-S205, if a first preset condition is not met, the following steps are performed:

A1: determining the second video block from the video block set according to the video interaction type;

A2: determining the target display region from the region set to be displayed; and A3: displaying the second video block within the target display region.

A1-A3 are similar to S203-S205 recited above. For details, see the corresponding descriptions of S203-S205, which will not be described here redundantly.

The first preset condition is a condition for stopping determining the second video block. The first preset condition may be one or more of: an end instruction triggered by the user being obtained, the first video blocks in the video block set being all used as the second video block, and the second video block of the display region being determined to be capable of restoring the target video.

Whether the second video blocks restore the target video may be determined using the original coordinate table and the moving coordinate table. If a first video block in the original coordinate table has same position coordinates with the second video block corresponding to the first video block, it may be confirmed that the currently displayed second video block is capable of restoring the target video.

In an embodiment of the present application, when the first preset condition is not met, the second video block is redetermined and is determined to be displayed in the target display region. Thus, the second video block can be selected for a plurality of times, and adjustment of the display regions of a plurality of second video blocks is realized.

In a possible implementation, the video display region may be split first, and then target videos is split according to the display regions obtained after the split. An embodiment of the present application provides a specific implementation of splitting the target video based on the display position of the target video within the video display region to obtain the video block set, which comprises the following three steps.

B1: the video display region of the target video is split to obtain the target number of display sub-regions.

After the target video is obtained, the video display region of the target video is split. The video display region of the target video is split into the target number of display sub-regions. The display sub-regions are minimum units of the display regions. The target number is at least two. The specific value of the target number is determined by the split manner.

In a possible implementation, boundary information (e.g., boundary dimensions and boundary coordinates) of the video display region may be obtained. The boundary coordinates may be based on a screen coordinate system of the display screen of the electronic device. Splitting grids are then established according to the boundary information of the video display region. For example, dimensions of the splitting grids may be, e.g., g*h. That is, the splitting grids are g-row h-column grids. g and h are positive integers, and a product of g and h is the target number. Each grid corresponds to one display sub-region.

B2: the target video is split based on the display sub-regions to obtain the target number of first video blocks, where the first video blocks are videos displayed in the corresponding display sub-regions.

The target video is then split based on the display sub-regions so that the first video blocks corresponding to the display sub-regions can be obtained.

In a possible implementation, video carries consistent with the dimensions of the splitting grids may be generated based on the splitting grids. By taking for example the g*h splitting grids, g*h video carriers may be generated. The video carrier is used to carry a video block. The video carriers are tiled in the video display region according to the splitting grids, and an integral input of the video carriers is set to the target video so that the first video block output by each video carrier can be obtained.

B3: the target number of first video blocks are combined into the video block set.

Further, to specify each first video block, a display style of the first video blocks may be adjusted using a vertex shader. On this basis, an embodiment of the present application provides a video processing method. Apart from the above steps, the following steps are further included.

C1: texture sampling is performed on a preset texture using the vertex shader according to the target number to obtain a target texture.

The vertex shader is an instruction code configured to realize scene rendering. The display style of the first video blocks may be adjusted using the vertex shader.

After the target number of the first video blocks is determined, the target number may be input to the vertex shader, realizing texture sampling on the preset texture using the vertex shader. The preset texture is used to embody the display style of the first video blocks. The preset texture is sampled by the vertex shader so that the target texture for adjusting the display style of the first video blocks can be obtained.

Specifically, for example, the value of the target number is 6, represented by 3*2. 3*2 represents that the first video blocks are obtained by splitting the target video in the uniform 3-row 2-column split manner. 3*2 is input to the vertex shader, and the vertex shader performs texture sampling on the present texture to obtain the target texture of the first video blocks corresponding to 3*2.

As an example, based on the above target number, an embodiment of the present application provides a specific implementation of the vertex shader sampling the preset texture. The vertex shader may expand the transverse dimension x of the preset texture 3 times and the longitudinal dimension y of the present texture 2 times, thereby realizing the expansion of the preset texture. A portion with x less than 1 and y less than 1 is obtained from the preset texture as the scaled-down preset texture. The scaled-down preset texture is split. Specifically, the transverse dimension 3 of the scaled-down preset texture is equally divided and the longitudinal dimension 2 is equally divided. The equally divided scaled-down preset texture is processed into a box-selected region style to obtain the target texture.

Further, in a possible implementation, the first video blocks may also be numbered to obtain index values corresponding to the first video blocks. Apart from inputting the target number to the vertex shader, the index values corresponding to the first video blocks are input to the vertex shader. After the scaled-down preset texture is equally divided, the target number of unit textures may be obtained. A corresponding index value is assigned to the unit texture, and the unit texture is processed into the box-selected region style. The processed unit texture is taken as the target texture. The target texture corresponds to a first video block having the same index value and is used to adjust the display style of the first video block corresponding to the same index value. Thus, a display style of adding a bounding box for the first video block can be realized subsequently using the vertex shader.

C2: the obtained target texture is determined as an output of the vertex shader.

The target texture obtained after the texture sampling is determined as the output of the vertex shader.

C3: the display style of the first video block is adjusted using the vertex shader.

The display style of the first video block is adjusted by the vertex shader.

Taking for example establishing the video carriers to realize the split of the target video, the vertex shader may be configured based on the video carriers to realize the adjustment of the display style of the first video block.

It needs to be noted that after the display style of the first video block is adjusted, the display style of the second video block corresponding to the first video block may be correspondingly adjusted. In other words, after the first video block A is determined as the second video block A, the second video block A may be displayed in the display style of the first video block A.

In the embodiment of the present application, the display style of the first video block may be adjusted using the first video block. The range of the first video blocks after split can be determined by the user conveniently. The visual effects of the target video can be enriched.

In a possible implementation, the embodiments of the present application provide three video interaction types. The three video interaction types and the corresponding video processing methods are described below, respectively.

Type I: the video interaction type may be a first interaction type.

The first interaction type may be displaying the second video block according to the target display region determined by the user.

Figure 4A:
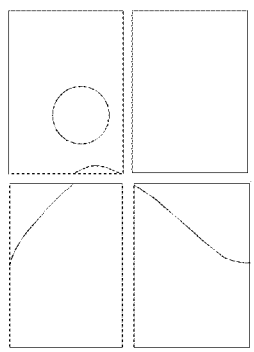
FIG. 4(a) is a schematic diagram of first video blocks provided in an embodiment of the present application.
Figure 4B:
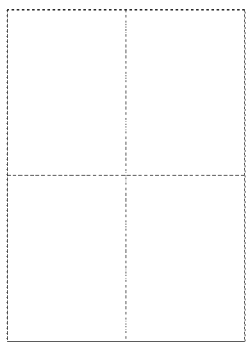
FIG. 4(b) is a schematic diagram of regions to be displayed provided in an embodiment of the present application.

The first video blocks are obtained by splitting the target video in a first split manner. Correspondingly, the regions to be displayed are the minimum units of the display regions obtained by splitting the video display region in the same first split manner. The split manner of the regions to be displayed is consistent with that of the first video blocks, and the obtained regions to be displayed correspond to the split regions of the first video blocks. FIG. 4 is a schematic diagram of first video blocks and regions to be displayed provided in an embodiment of the present application. FIG. 4(a) is a schematic diagram of first video blocks provided in an embodiment of the present application. FIG. 4(a) shows the first video blocks obtained after splitting the target video in the first split manner. FIG. 4(b) is a schematic diagram of regions to be displayed provided in an embodiment of the present application. FIG. 4(b) shows the regions to be displayed obtained after splitting the video display region in the first split manner.

The first split manner may be uniform split into rectangles in a same shape, or may be random split to obtain circles of different shapes, which will not be limited in the embodiments of the present application and can be set by those skilled in the art as needed.

In a possible implementation, when the video interaction type is the first interaction type, the second video block may be determined randomly so that the user restores the second video block into the original split region of the target video.

An embodiment of the present application provides a specific implementation of determining the second video block from the video block set according to the video interaction type, including:

optionally selecting one first video block as the second video block from the video block set according to the first interaction type.

When the video interaction type is the first interaction type, one first video block may be randomly selected as the second video block from the video block set. The user may determine the target display region based on the appearing second video block to realize restoring the second video block into the original split region of the target video.

In a possible implementation, after the second video block is determined, the second video block is deleted from the video block set to avoid subsequent repeated selection of the same first video block as the second video block.

Figure 5:
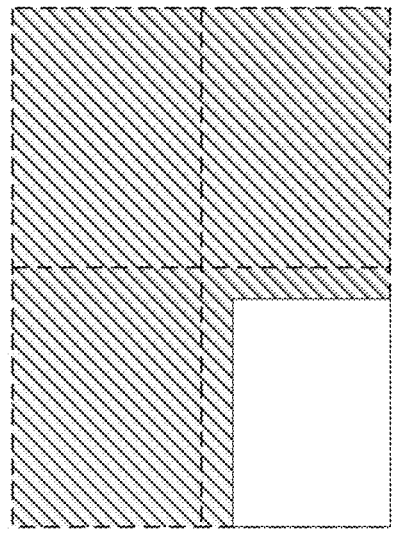
FIG. 5 is a schematic diagram of a starting display region and regions to be displayed provided in an embodiment of the present application.
Figure 6:
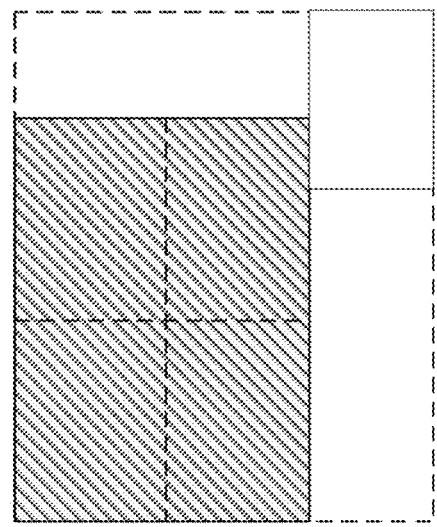
FIG. 6 is a schematic diagram of another starting display region and regions to be displayed provided in an embodiment of the present application.

It needs to be noted that the embodiments of the present application have no limitation on the starting display region of the second video block. The starting display region may overlap a region to be displayed. FIG. 5 is a schematic diagram of a starting display region and regions to be displayed provided in an embodiment of the present application. The regions enclosed by the dotted borders and shadowed are the regions to be displayed. The region enclosed by the solid-line border is the starting display region. Moreover, to avoid the starting display region from covering the region to be displayed, an area of an overlapping region of the starting display region and the region to be displayed in the display region is less than a threshold. In another possible case, the starting display region may not overlap the region to be displayed. FIG. 6 is a schematic diagram of another starting display region and regions to be displayed provided in an embodiment of the present application. The region enclosed by the dotted border is the video display region; the display regions shadowed are the regions to be displayed; and the display region enclosed by the solid-line border is the starting display region.

In in possible implementation, the target display region may be determined by the user. An embodiment of the present application provides a specific implementation of determining the target display region from the region set to be displayed, including:

obtaining first coordinates of a first selected position triggered by a user; and determining the region to be displayed of the first coordinates as the target display region.

The user may trigger and select the target display region for displaying the second video block within the video display region. The embodiments of the present application have no limitation on a trigger manner of the user. For example, the user may select the target display region by tapping. For another example, the user may select the target display region by moving a selection box. The user may also trigger a particular region to generate a determination instruction for adjusting the selection box so as to determine the target display region. For example, the user may determine the region to be displayed on the right in the video display region as the target display region by triggering a particular region, such as a lower right region of the screen.

In the video display region, first coordinates of a first selected position triggered by the user are obtained. The first selected position is a selected position determined by the user through a selection operation. The first coordinates are used to determine the first selected position. The first coordinates may be based on the screen coordinate system of the display screen of the electronic device. The specific form of the first coordinates may be related to the shape of the first selected position. For example, when the first selected position is a contact point, the corresponding first coordinates are coordinates of the contact point. For another example, when the first selected position is a selection box, the corresponding first coordinates are coordinates of a boundary vertex of the selection box.

The region to be displayed of the first coordinates is determined as the display region selected by the user. The region to be displayed of the first coordinates is determined as the target display region.

Further, the region set to be displayed may include at least two regions to be displayed. Correspondingly, an embodiment of the present application further provides a specific implementation of determining the region to be displayed of the first coordinates as the target display region, including:

obtaining position coordinates of each of the regions to be displayed in the region set to be displayed;

determining a distance of the first coordinates from each of the regions to be displayed based on the first coordinates and the position coordinates of each of the regions to be displayed; and determining the region to be displayed having a minimum distance from the first coordinates as the target display region.

It will be understood that there is a plurality of regions to be displayed within the video display region. The position coordinates of each of the regions to be displayed in the region set to be displayed are obtained. The position coordinates of the region to be displayed may be based on the screen coordinate system of the display screen of the electronic device. The position coordinates of the region to be displayed may be coordinates of the center point of the region to be displayed, or coordinates of a key point in the boundary line of the region to be displayed.

Based on the position coordinates of the region to be displayed and the first coordinates of the first selected position, a distance between the position coordinates and the first coordinates, i.e., a distance between the region to be displayed and the first coordinates, may be calculated. The manner of calculating the distance may be determined according to the form of the first coordinates and the position coordinates. For example, when the first coordinates and the position coordinates both represent center points, the distance between the first coordinates and the position coordinates may be directly calculated. For another example, when the first coordinates and the position coordinates both indicate boundaries, the distance may be determined by calculating an overlap ratio of the boundaries.

Figure 7:
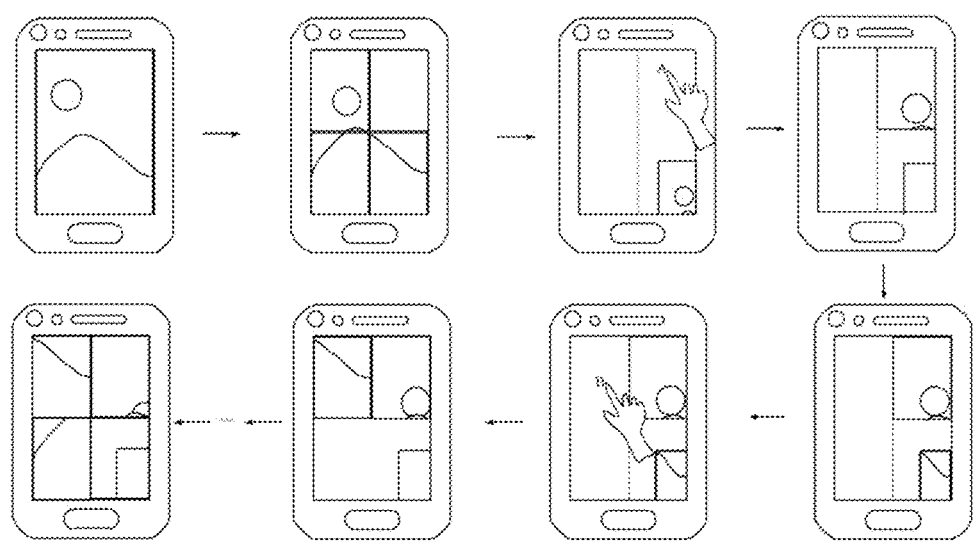
FIG. 7 is a schematic diagram of a framework of a video processing method in a first interaction type scenario provided in an embodiment of the present application.

As an example, FIG. 7 is a schematic diagram of a framework of a video processing method in a first interaction type scenario provided in an embodiment of the present application.

After the first interaction type is triggered and selected by the user, a video being currently played may be determined as the target video. The target video is obtained and split based on the display position of the target video within the video display region to obtain the video block set including 4 first video blocks. One of the first video blocks is selected as the second video block based on the first interaction type and displayed within the starting display region. The determined second video block is deleted from the video block set. The first coordinate point A of the first selected position triggered by the user is obtained. The region to be displayed of the first coordinate point A is determined as the target display region. The target display region is updated as the display region of the second video block, and the second video block is displayed within the target display region.

The second video block is then determined from the remaining three first video blocks not selected as the second video block, and is displayed within the starting display region. The determined second video block is deleted from the first video blocks. The first coordinate point B of the first selected position triggered by the user is obtained. The region to be displayed of the first coordinate point B is determined as the target display region. The target display region is updated as the display region of the second video block, and the second video block is displayed within the target display region.

The second video block is then determined from the two first video blocks of the video block set, and a target display position is determined until the first preset condition is met. The first preset condition is stopping redetermining the second video block when four first video blocks are all determined as the second video blocks.

Based on the above contents, under the first interaction type, the determined second video block may be displayed in the target display region specified by the user. The user may move the second video block to the original split region in the target video. The interestingness can be improved and the user experience can be enhanced.

In a possible implementation, the target display region determined by the user may be determined as an occupied display region. That is, the display region has a correspondingly displayed video block. In this case, an embodiment of the present application provides a video processing method. Apart from the above steps, the video processing method further comprises:

if the target display region is an occupied display region, repeatedly redetermining the target display region from the region set to be displayed until the redetermined target display region is capable of displaying the second video block or a second preset condition is met, where the occupied display region has a correspondingly displayed video block.

After the target display region of the second video block is determined, the target display video block may be determined as a fixed display region of the second video block. The embodiments of the present application have no limitation on the trigger manner for determining the fixed display region of the second video block. For example, in a scenario, timing is started when the second video block is displayed in the starting display region. When the time reaches a preset time, the target display region where the second video block is located is determined as the occupied display region. For another example, in another scenario, after an instruction of triggering and selecting next second video block by the user is detected, the target display region where the currently determined second video block is located is determined as the occupied display region. For another example, in still another scenario, after a number of times of triggering and selecting the target display region by the user is detected to reach a preset number of times, the target display region determined at the last time is determined as the occupied display region.

If the target display region determined by the user in the current process of determining the target display region is the occupied display region, it indicates that the target display region has displayed another video block.

In a possible implementation, whether the target display region is the occupied display region may be determined based on the moving coordinate table. When the coordinates of the target display region determined by the user in the moving coordinate table are coordinates of a display region corresponding to other video block, it indicates that the target display region is the occupied display region.

In this case, the user needs to perform reselection. The target display region from the region set to be displayed is repeatedly redetermined until the redetermined target display region is capable of displaying the second video block or the second preset condition is met. The second preset condition may be that the number of times of triggering and selecting the target display region by the user reaches a number threshold or that a duration of triggering and selecting the target display region by the user reaches a time threshold.

In an embodiment of the present application, by redetermining the target display region selected by the user when the target display region is the occupied display region, it can be avoided that the occupied display region determined to display the video block repeatedly displays other video blocks. The user experience is enhanced.

Type II: the video interaction type may be a second interaction type.

The second interaction type may be movably displaying the second video block within the determined target display region.

To achieve the visual effect of movably displaying the second video block, the target video may be split in the second split manner. The second split manner is uniform split into n rows and m columns, where n and m are positive integers; a product of n and m is the target number; and m is greater than 1. The first video blocks obtained in the second split manner are regular in shape.

Correspondingly, the video interactive display region is used for splitting the display regions of the regions to be displayed, which are display regions for realizing the movable display effect of the second video block. The video interactive display region belongs to the video display region. The video interactive display region may be part of display regions of the video display region or all display regions of the video display region. The regions to be displayed are minimum units of the display regions obtained by splitting the video interactive display region in the second split manner. The second split manner is uniform split into n rows, or uniform split into m columns.

Figure 8:
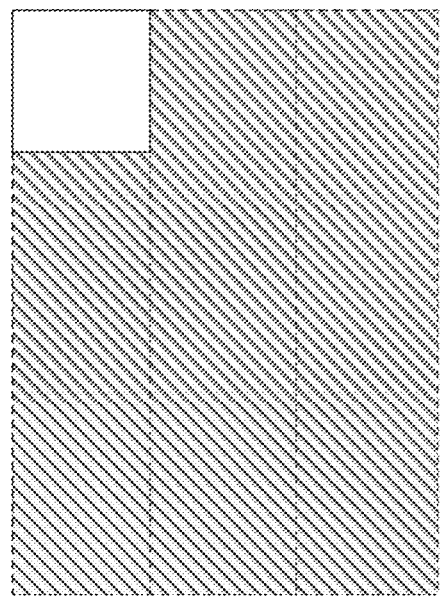
FIG. 8 is a schematic diagram of a starting display region and regions to be displayed provided in an embodiment of the present application.

In a possible implementation, the starting display region may belong to the video interactive display region. For example, the starting display region may be within a region to be displayed. A length of the starting display region in a horizontal direction is the same as a length of the region to be displayed in the horizontal direction, and a length of the starting display region in a vertical direction is smaller than 1/n of a length of the video display region in the vertical direction. Moreover, an upper boundary of the starting display region overlaps an upper boundary of the region to be displayed. FIG. 8 is a schematic diagram of a starting display region and regions to be displayed provided in an embodiment of the present application. Values of m and n are 3. The regions enclosed by the dotted borders and shadowed are the regions to be displayed. The region enclosed by the solid-line border is the starting display region. Thus, the visual effect of the starting display region staying at the top of the region to be displayed can be achieved. It needs to be noted that the video interactive display region comprises at least two regions to be displayed, and the starting display region may belong to any region to be displayed.

In another possible implementation, the starting display region may not belong to the video interactive display region. For example, the video display region may be firstly split into the video interactive display region and the starting display region. The video interactive display region is then split to obtain the regions to be displayed.

Further, an embodiment of the present application provides a specific implementation of determining the target display region from the region set to be displayed, including:
if a second selected position triggered by the user is detected, obtaining second coordinates of the second selected position; and determining the region to be displayed of the second coordinates as the target display region; and
if the second selected position triggered by the user is not detected, determining the target display region based on a current display region of the second video block, or optionally selecting a region to be displayed from the region set to be displayed as the target display region.

If the second selected position triggered by the user is detected within the video interactive display region, second coordinates of the second selected position are obtained. The region to be displayed of the second coordinates is determined as the target display region.

The manner of detecting the second selected position and determining the target display region with the second coordinates of the second selected position is similar to the manner of determining the first selected position and determining the target display region with the first coordinates of the first selected position, which may be as shown above and will not be described here redundantly.

If the second selected position triggered by the user is not detected within the region to be displayed, the target display region is determined based on a current display region of the second video block.

The current display region is a display region where the second video block is currently located. If the target display region is never determined for the second video block, the current display region is the starting display region. If the second video block has the corresponding target display region, the current display region is the target display region of the second video block.

In a possible implementation, if the current display region is the starting display region, the region to be displayed closest to the starting display region may be determined as the target display region. If the current display region is the previously determined target display region of the second video block, the target display region is continuously determined as the target display region of the second video block.

Moreover, when the second selected position triggered by the user is not detected, a region to be displayed may be randomly determined as the target display region from the region set to be displayed.

In an embodiment of the present application, the target display region may be determined flexibly so that the display region of the second video block can be adjusted conveniently.

Correspondingly, an embodiment of the present application further provides a specific implementation of displaying the second video block within the target display region, including:
repeatedly moving the current display region of the second video block by a target step size in a target direction within the target display region, and displaying the second video block within the current display region until the target display region is redetermined or a third preset condition is met, where the current display region is a display region occupied by displaying the second video block; and the current display region is smaller than the target display region.

The current display region of the second video block is moved by a target step size within the target display region in the target direction, and the second video block is displayed within the current display region. Thus, the adjustment of the position of the current display region within the target display region is realized. By repeatedly moving the current display region of the second video block by a target step size in the target direction within the target display region and displaying the second video block within the current display region, the visual effect of continuously movably displaying the second video block can be achieved.

The target step size is a moving distance of moving the current display region each time. The target step size may be determined by controlling a moving speed of the current display region. When the current display region moves fast, a large target step size may be set. When the current display region moves slowly, a small target step size may be set.

After the current display region is adjusted, the second video block is displayed within the current display region.

When the target display region is redetermined and the third preset condition is met, moving the current display region is stopped.

When the target display region is not the region to be displayed where the current display region is located, the target display region needs to be adjusted. The current display region is horizontally moved into the target display region. The region to be displayed where the adjusted current display region is located is the target display region, the step of repeatedly moving the current display region in the target direction by the target step size and subsequent steps are performed continuously.

The third preset condition is used to indicate stopping moving the current display region within the target display region. The third preset condition may be that a lower boundary of the current display region overlaps an upper boundary of the occupied display region or overlaps a lower boundary of the target display region. Alternatively, the third preset condition may be that the current display region has an overlapping region with the occupied display region or overlaps a lower boundary of the region to be displayed. The occupied display region is the display region for which the video block to be displayed has been determined.

It will be understood that regarding the second interaction type, the boundary of the fixed display region in the video interactive display region is determined first. To enable the user to restore the split region of the second video block in the target video, the first video block located at the boundary of the video display region of the target video may be firstly determined as the second video block.

On this basis, an embodiment of the present application provides two specific implementations of determining the second video block from the video block set according to the video interaction type.

First, the second split manner is uniform split into n rows.

Correspondingly, determining the second video block from the video block set according to the video interaction type comprises the following steps.

The following steps are repeatedly performed until a fourth preset condition is met:

D1: one first video block is optionally selected as the second video block from the first video blocks in the m-th column in the target direction according to the second interaction type.

When the regions to be displayed include n rows, video blocks to be displayed in the display regions of the last column in the target direction may be determined first. A first video block in the m-th column in the target direction is firstly determined as the second video block. The target direction may be leftward or rightward.

One of the first video blocks in the m-th column in the target direction is optionally selected as the second video block. The video blocks to be displayed may be determined first in a moving direction of the current display position.

In a possible implementation, after the target video is split, index numbers may be assigned to the obtained first video blocks. The index numbers of the first video blocks are related to the split regions of the first blocks in the video display regions of the target video. When the second video block is selected, a range of the index numbers of the first video blocks in the m-th column in the target direction may be determined first, and an index number is selected from the range to determine the second video block.

D2: the second video block is deleted from the video block set.

The determined second video block is deleted from the video block set to avoid reselection.

D3: when the first video blocks of the m-th column in the target direction are all selected as the second video blocks, 1 is subtracted from m.

If the first video blocks of the m-th column in the target direction are all selected as the second video blocks, it indicates that the first video blocks of the m-th column in the target direction have been selected completely, and the first video blocks of a previous column need to be selected. 1 is subtracted from m.

The fourth preset condition may be that the video block set comprises no first video block, i.e., all of the first video blocks are determined as the second video blocks.

Second, the second split manner is uniform split into m columns.

Correspondingly, determining the second video block from the video block set according to the video interaction type comprises the following steps:
    repeatedly performing the following steps until a fifth preset condition is met:
    optionally selecting one first video block as the second video block from the first video blocks in the nth row in the target direction according to the second interaction type;
    deleting the second video block from the first video blocks; and
    when the first video blocks of the nth row in a vertical downward direction are selected as the second video blocks, subtracting 1 from n.

The target direction may be upward or downward.

The manner of determining the second video block in the second scenario is similar to the manner of the determining the second video block in the first scenario, which will not be described here redundantly.

Figure 9:
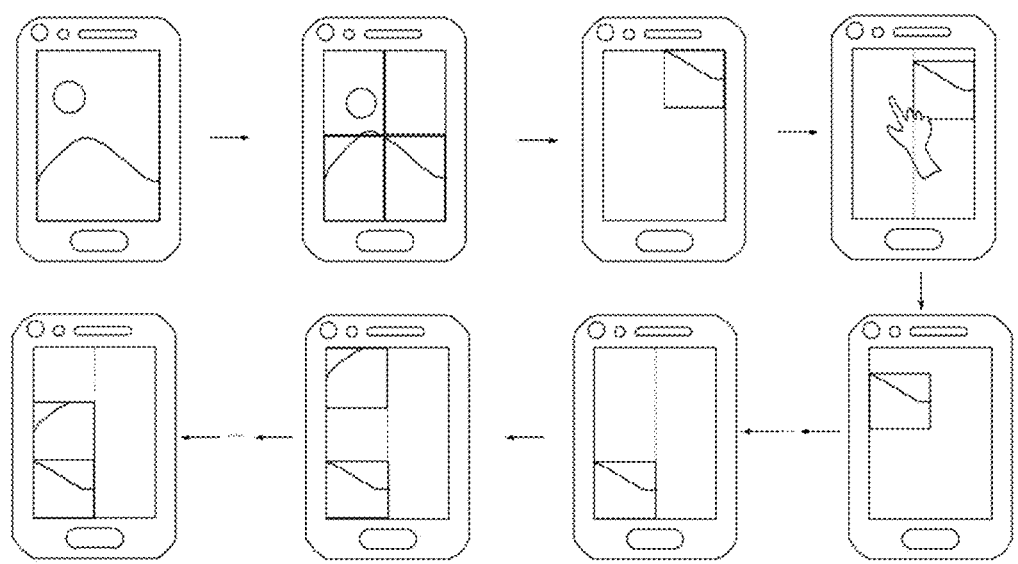
FIG. 9 is a schematic diagram of a framework of a video processing method in a second interaction type scenario provided in an embodiment of the present application.

As an example, FIG. 9 is a schematic diagram of a framework of a video processing method in a second interaction type scenario provided in an embodiment of the present application.

After video interaction triggered and selected by the user is obtained, the preset second interaction type is determined. The video being currently played is determined as the target video. The target video is obtained and split based on the display position of the target video within the video display region. The target video is uniformly split into 2 rows and 2 columns to obtain 4 first video blocks. The second split manner is uniform split into 2 columns, and two regions to be displayed are obtained. One of two first video blocks of the second row in the vertical downward direction is optionally selected as the second video block. One region to be displayed (e.g., the second region to be displayed from left to right) is optionally selected from two regions to be displayed. The starting display region is set at the top of the region to be displayed, and the second video block is displayed within the starting display region.

If a trigger by the user is not detected, the second region to be displayed from left to right is determined as the target display region, and the starting display region is determined as the current display region which is moved by a target step size in the vertical downward direction. The second video block is displayed within the current display region. Thus, the visual effect of moving the second video block downwards can be achieved. The first region to be displayed from left to right is tapped by the user. Correspondingly, the second selected position triggered by the user is detected; the second coordinates of the second selected position are obtained, and on this basis, the first region to be displayed from left to right is determined as the target display region. In this case, the target display region is the region to be displayed where the current display region is located. The current display region is horizontally moved into the first region to be displayed from left to right, i.e., the newly determined target display region. Within the target display region, the current display region is moved downwards in the vertical direction by the target step size, and the second video block is displayed within the current display region. When the third preset condition is met, i.e., the lower boundary of the current display region overlaps the upper boundary of the occupied display region or the current display region has an overlapping region with the occupied display region, moving the current display region is stopped.

Further, determining one first video block in the second row in the vertical downward direction as the second video block according to the second interaction type may be performed again. Moreover, the target display region of the second video block is redetermined, and subsequent operations are performed. Thus, the adjustment of the display regions for a plurality of second video blocks is realized. The user experience is enriched.

In this example, the first preset condition may be that the target display region is not moved, or the first video blocks are all the second video blocks.

Based on the above contents, the determined second video block may be movably displayed in the target display region based on the second interaction type. The interestingness of interaction can be improved and the user experience can be enhanced.

Type III: the video interaction type may be a third interaction type.

With the third interaction type, the visual effect of interchangeably displaying the current display region of the second video block and the target display region can be achieved.

To exchange the display region of the second video block and the target display region, the target video and the video display region may be separately split in the third split manner.

The third split manner is uniform split into p rows and q columns, where p and p are positive integers; a product of p and q is the target number. The target video is split in the third split manner to obtain the first video blocks.

Correspondingly, the starting display regions and the regions to be displayed are the minimum units of the display regions obtained by splitting the video display region in the third split manner. The number of starting display regions is a preset number. The preset number is less than or equal to the target number. The preset number is consistent with the number of second video blocks. The preset number may be preset, and may also be determined according to a selection instruction triggered by the user. It needs to be noted that the first video blocks displayed in the starting display regions may be obtained from the preset number of first video blocks optionally selected from the target number of first video blocks.

When the preset number is less than the target number, the display regions of the minimum units other than the starting display regions may be determined as the regions to be displayed.

When the preset number is equal to the target number, the display regions of the minimum units obtained by splitting the video display region may be determined as the regions to be displayed.

Based on the starting display regions and the regions to be displayed determined as above, an embodiment of the present application provides a specific implementation of determining the second video block from the video block set according to the video interaction type, including:

randomly selecting the preset number of first video blocks as third video blocks from the video block set according to the third interaction type;

displaying the third video blocks within the starting display regions, where the starting display regions are in one-to-one correspondence with the third video blocks;

obtaining a video block selection instruction triggered by the user; and determining the second video block from the third video blocks based on the video block selection instruction.

The third video blocks are displayed for the user so that the user can select the second video block therefrom. The preset number of first video blocks are randomly selected as the third video blocks from the video block set based on the third interaction type. The third video blocks are displayed within the preset number of starting display regions. The starting display regions are in one-to-one correspondence with the third video blocks.

The video block selection instruction triggered by the user is obtained. The video block selection instruction is used to indicate the second video block selected by the user. The second video block is determined from third video blocks based on the video block selection instruction.

Specifically, the video block selection instruction triggered by the user may include third coordinates of a third selected position triggered by the user. The third selected position is a selected position determined by the user through a selection operation. The third coordinates are used to determine the third selected position. The third coordinates may be based on the screen coordinate system of the display screen of the electronic device. The specific form of the third coordinates may be related to the shape of the third selected position. The third video block displayed within the starting display region of the third coordinates may be determined as the second video block.

Figure 10:
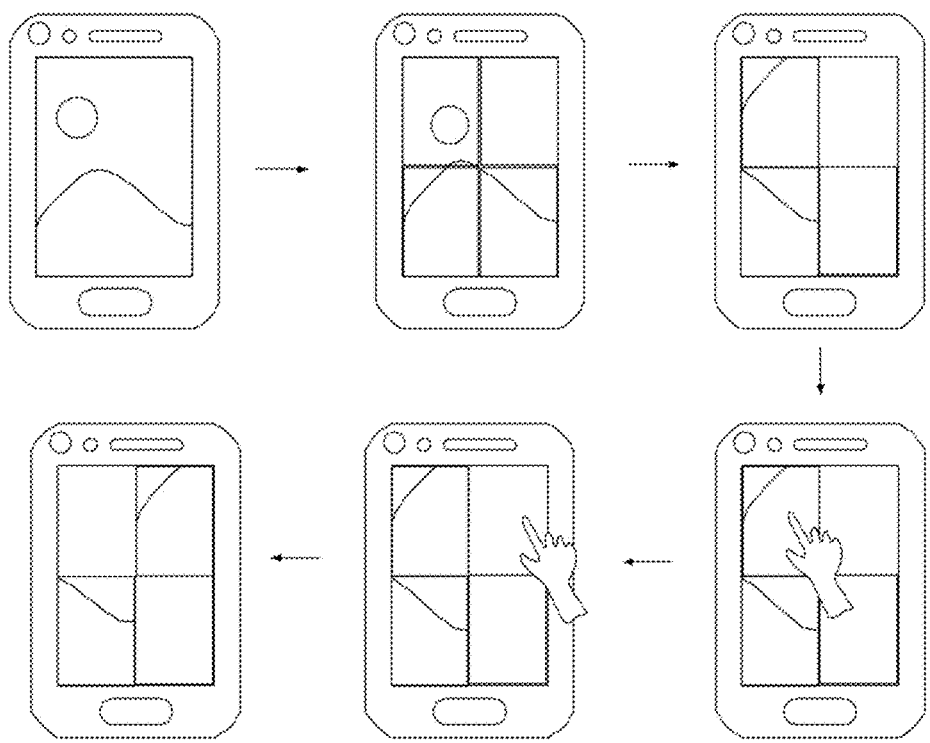
FIG. 10 is a schematic diagram of a framework of a video processing method in a third interaction type scenario provided in an embodiment of the present application.

As an example, FIG. 10 is a schematic diagram of a framework of a video processing method in a third interaction type scenario provided in an embodiment of the present application.

After a trigger of starting video interaction by the user is obtained, a video being currently played is determined as the target video. The target video is obtained and split based on the display position of the target video within the video display region in the third split manner to obtain four first video blocks. The video display region is split in the third split manner to obtain four display regions of the minimum units. Three display regions are determined as the starting display regions. Three first video blocks are then randomly selected as three third video blocks and correspondingly displayed within the starting display regions. The display regions of the minimum units not determined as the starting display regions are determined as the regions to be displayed. The video block selection instruction triggered by the user is obtained, and the second video block is determined based on the video block selection instruction. The target display region may be determined from the region set to be displayed. The second video block is displayed within target display region.

In an embodiment of the present application, the first preset condition may include obtaining a termination instruction triggered by the user, or that the display region displaying a video block is the same as the video display region of the target video. When the first preset condition is not met, the step of determining the second video block from the video block set according to the video interaction type and subsequent steps are performed again.

In a possible implementation, displaying the second video block may be limited based on a positional relationship between the target display region and the current display region of the second video block.

On this basis, an embodiment of the present application provides a specific implementation of displaying the second video block within the target display region, including:

if the target display region is adjacent to a current display region of the second video block, displaying the second video block in the target display region, where the current display region is a display region occupied by displaying the second video block.

The target display region being adjacent to the current display region of the second video block refers to that upper boundaries, lower boundaries, left boundaries, or right boundaries of the target display region and the current display region of the second video block overlap. In a possible implementation, the position coordinates of the target display region and the position coordinates of the second video block may be obtained, and a distance value between the target display region and the second video block is calculated with the position coordinates. If the distance value is less than or equal to a boundary length of one display region, it may be considered that the target display region is adjacent to a current display region of the second video block.

The current display region of the second video block is a display region where the second video block is located. The current display region may be the starting display region, and may also be the target display region historically selected by the user. If the target display region is adjacent to a current display region of the second video block, the target display region may be determined as the target display region of the second video block, and the second video block is displayed within the target display region.

In a possible implementation, the current display region of the second video block may also be updated as the region to be displayed, achieving the effect of exchanging the display region of the second video block.

Moreover, in some cases, the target display region displays a video block determined to be displayed. On this basis, an embodiment of the present application provides a video processing method. Apart from the above steps, the video processing method further comprises:

if the target display region has a fourth video block determined to be displayed, determining a current display region of the second video block as the target display region of the fourth video block; and displaying the fourth video block in the target display region of the fourth video block.

The fourth video block is a video block of the determined display region within the video display region. The target display region may have a video block determined to be displayed. To normally display the second video block within the target display region, the current display region of the second video block is determined as the target display region of the fourth video block. Besides, the fourth video block is displayed in the target display region of the fourth video block.

In an embodiment of the present disclosure, by determining the current display region of the second video block as the target display region of the fourth video block, exchange of the display regions of the second video block and the fourth video block may be realized. Thus, the moving manners of the second video block can be enriched; the interestingness can be improved and the user experience can be enhanced.

Based on the video processing method provided in the above method embodiments, an embodiment of the present disclosure further provides a video processing apparatus. The video processing apparatus will be described below with reference to the accompanying drawings.

Figure 11:
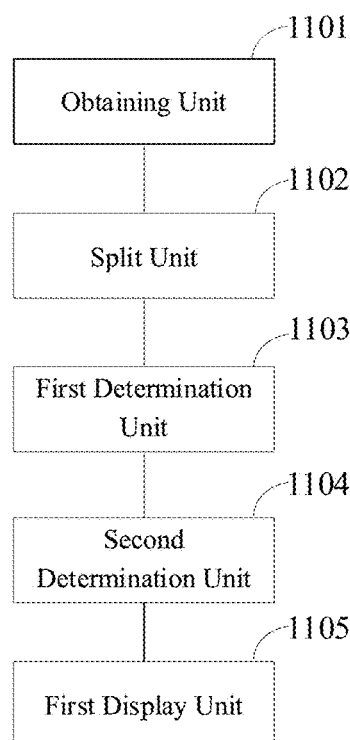
FIG. 11 is a structural schematic diagram of a video processing apparatus provided in an embodiment of the present application.

FIG. 11 is a structural schematic diagram of a video processing apparatus provided in an embodiment of the present application. As shown in FIG. 11, the video processing apparatus comprises:

an obtaining unit 1101 configured to obtain a target video;

a split unit 1102 configured to split the target video, based on a display position of the target video, within a video display region to obtain a video block set, where the video block set comprises a target number of first video blocks; the target number is at least two; and the video display region is a display region in which the target video is displayed;

a first determination unit 1103 configured to determine a second video block from the video block set according to a video interaction type, wherein the second video block is displayed in a starting display region which belongs to the video display region;

a second determination unit 1104 configured to determine a target display region from a region set to be displayed, where the region set to be displayed comprises one or more regions to be displayed, and the regions to be displayed belong to the video display region and are minimum units of the display region for displaying the second video block; and a first display unit 1105 configured to display the second video block within the target display region.

In a possible implementation, the video processing apparatus further comprises:

a first performing unit configured to, if a first preset condition is not met, perform the following steps:

determining the second video block from the video block set according to the video interaction type;

determining the target display region from the region set to be displayed; and displaying the second video block within the target display region.

In a possible implementation, the video interaction type is a first interaction type; the first video blocks are obtained by splitting the target video in a first split manner; and the regions to be displayed are the minimum units of display regions obtained by splitting the video display region in the first split manner.

The second determination unit 1104 comprises:

a first obtaining sub-unit configured to obtain first coordinates of a first selected position triggered by a user; and a first determination sub-unit configured to determine the region to be displayed of the first coordinates as the target display region.

In a possible implementation, the number of there are two regions to be displayed; and the first determination sub-unit is specifically configured to: obtain position coordinates of each of the regions to be displayed in the region set to be displayed; determine a distance of the first coordinates from each of the regions to be displayed based on the first coordinates and the position coordinates of each of the regions to be displayed; and determine the region to be displayed having a minimum distance from the first coordinates as the target display region.

In a possible implementation, the video interaction type is the first interaction type; and the first determination unit 1103 is specifically configured to: optionally select one first video block as the second video block from the video block set according to the first interaction type.

In a possible implementation, the video interaction type is the first interaction type; and the video processing apparatus further comprises:
- a second performing unit configured to: if the target display region is an occupied display region, repeatedly redetermine the target display region from the region set to be displayed until the redetermined target display region is capable of displaying the second video block or a second preset condition is met, where the occupied display region has a correspondingly displayed video block.

In a possible implementation, the video interaction type is a second interaction type; the first video blocks are video blocks obtained by uniformly splitting the target video in an n-row m-column split manner, where n and m are positive integers; m is greater than 1; and a product of n and m is the target number;

the regions to be displayed are the minimum units of display regions obtained by splitting a video interactive display region in a second split manner; the second split manner is uniform split into n rows or uniform split into m columns; the video interactive display region belongs to the video display region; and the video display region comprises the video interactive display region.

The second determination unit 1104 comprises:
- a second determination sub-unit configured to: if a second selected position triggered by the user is detected, obtain second coordinates of the second selected position; and determine the region to be displayed of the second coordinates as the target display region; and
- a third determination sub-unit configured to: if the second selected position triggered by the user is not detected, determine the target display region based on a current display region of the second video block, or optionally select a region to be displayed from the region set to be displayed as the target display region.

In a possible implementation, the first display unit 1105 is specifically configured to: repeatedly move the current display region of the second video block by a target step size in a target direction within the target display region, and display the second video block within the current display region until the target display region is redetermined or a third preset condition is met, where the current display region is a display region occupied by displaying the second video block; and the current display region is smaller than the target display region.

In a possible implementation, the second split manner is uniform split into n rows; and the first determination unit 1103 is specifically configured to repeatedly perform the following steps until a fourth preset condition is met:
- optionally selecting one first video block as the second video block from the first video blocks in an m-th column in the target direction according to the second interaction type;
- deleting the second video block from the video block set; and
- when the first video blocks of the m-th column in the target direction are all selected as the second video blocks, subtracting 1 from m.

In a possible implementation, the second split manner is uniform split into m columns; and the first determination unit 1103 is specifically configured to repeatedly perform the following steps until a fifth preset condition is met:
- optionally selecting one first video block as the second video block from the first video blocks in the nth row in the target direction according to the second interaction type;
- deleting the second video block from the first video blocks; and
- when the first video blocks of the nth row in a vertical downward direction are selected as the second video blocks, subtracting 1 from n.

In a possible implementation, the video interaction type is a third interaction type; and the first video blocks are obtained by splitting the target video in a third split manner which is uniform split into p rows and q columns, where p and q are positive integers; and a product of p and q is the target number.

The starting display regions are minimum units of display regions obtained by splitting the video display region in the third split manner; a number of the starting display regions is a preset number which is less than or equal to the target number; and the regions to be displayed are minimum units of display regions obtained by splitting the video display region in the third split manner.

The first determination unit 1103 comprises:
- a fourth determination sub-unit configured to randomly select the preset number of first video blocks as third video blocks from the video block set according to the third interaction type;
- a display sub-unit configured to display the third video blocks within the starting display regions, where the starting display regions are in one-to-one correspondence with the third video blocks;
- a second obtaining sub-unit configured to obtain a video block selection instruction triggered by the user; and
- a fifth determination sub-unit configured to determine the second video block from the third video blocks based on the video block selection instruction.

In a possible implementation, the first display unit 1105 is specifically configured to: if the target display region is adjacent to a current display region of the second video block, display the second video block in the target display region, where the current display region is a display region occupied by displaying the second video block.

In a possible implementation, the video processing apparatus further comprises:
- a replacement unit configured to: if the target display region has a fourth video block determined to be displayed, determine the current display region of the second video block as the target display region of the fourth video block; and
- a second display unit configured to display the fourth video block in the target display region of the fourth video block.

In a possible implementation, the split unit 1102 comprises:
- a first split sub-unit configured to split the video display region of the target video to obtain the target number of display sub-regions;
- a second split sub-unit configured to split the target video based on the display sub-regions to obtain the target number of first video blocks, where the first video blocks are videos displayed in the corresponding display sub-regions; and
- a combination sub-unit configured to combine the target number of first video blocks into the video block set.

In a possible implementation, the video processing apparatus further comprises:

a sampling unit configured to perform texture sampling on a preset texture using a vertex shader according to the target number to obtain a target texture;

a setting unit configured to determine the target texture as an output of the vertex shader; and an adjustment unit configured to adjust a display style of the first video blocks using the vertex shader.

Based on the video processing method provided in the above method embodiments, the present disclosure further provides an electronic device, including: one or more processors; and a storage apparatus storing one or more programs, where the one or more programs, when executed by the one or more processors, cause the one or more processors to implement the video processing method described in any foregoing embodiment.

Figure 12:
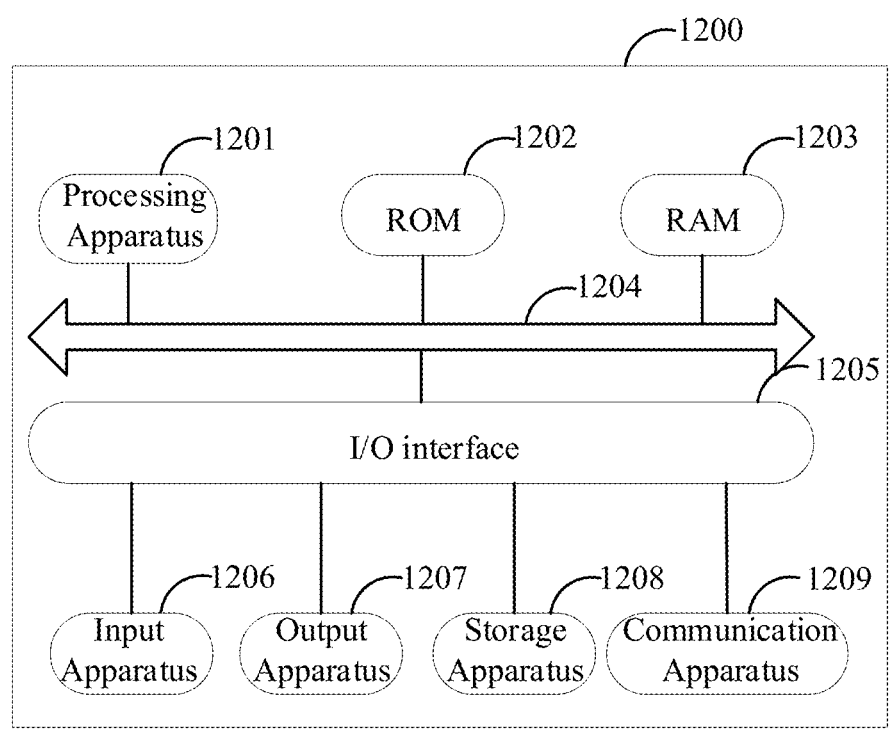
FIG. 12 is a schematic diagram of a basic structural of an electronic device provided in an embodiment of the present application.

Referring to FIG. 12, FIG. 12 illustrates a schematic structural diagram of an electronic device 1200 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 12 is merely an example, and should not pose any limitation to the functions and the range of use of the embodiments of the present disclosure.

As illustrated in FIG. 12, the electronic device 1200 may include a processing apparatus 1201 (e.g., a central processing unit, a graphics processing unit, etc.), which can perform various suitable actions and processing according to a program stored in a read-only memory (ROM) 1202 or a program loaded from a storage apparatus 1208 into a random-access memory (RAM) 1203. The RAM 1203 further stores various programs and data required for operations of the electronic device 1200. The processing apparatus 1201, the ROM 1202, and the RAM 1203 are interconnected by means of a bus 1204. An input/output (I/O) interface 1205 is also connected to the bus 1204.

Usually, the following apparatus may be connected to the I/O interface 1205: an input apparatus 1206 including, for example, a touch screen, a touch pad, a keyboard, a mouse, a camera, a microphone, an accelerometer, a gyroscope, or the like; an output apparatus 1207 including, for example, a liquid crystal display (LCD), a loudspeaker, a vibrator, or the like; a storage apparatus 1208 including, for example, a magnetic tape, a hard disk, or the like; and a communication apparatus 1209. The communication apparatus 1209 may allow the electronic device 1200 to be in wireless or wired communication with other devices to exchange data. While FIG. 12 illustrates the electronic device 1200 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which comprises a computer program carried by a non-transitory computer-readable medium. The computer program comprises program codes for performing the methods shown in the flowcharts. In such embodiments, the computer program may be downloaded online through the communication apparatus 1209 and installed, or may be installed from the storage apparatus 1208, or may be installed from the ROM 1202. When the computer program is executed by the processing apparatus 1201, the above-mentioned functions defined in the methods of some embodiments of the present disclosure are performed.

The electronic equipment provided by the embodiment of the present application belongs to the same inventive concept as the video processing method provided by the above embodiment, and the technical details not described in detail in this embodiment can be found in the above embodiment, and this embodiment has the same beneficial effects as the above embodiment.

Based on the video processing method provided in the above method embodiments, an embodiment of the present disclosure provides a computer storage medium storing a computer program, where the computer program, when executed by a processor, causes implementing the video processing method described in any foregoing embodiment.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, cause the electronic device to perform the above video processing method.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium comprises, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present application, [Example 1] provides a video processing method, comprising:

obtaining a target video;

splitting the target video, based on a display position of the target video, within a video display region to obtain a video block set, wherein the video block set comprises a target number of first video blocks, the target number is at least two, and the video display region is a display region displaying the target video;

determining a second video block from the video block set according to a video interaction type, wherein the second video block is displayed in a starting display region, and the starting display region belongs to the video display region;

determining a target display region from a region set to be displayed, the region set to be displayed comprises one or more regions to be displayed, and the region to be displayed belongs to the video display region and is a minimum unit of a display region for displaying the second video block; and displaying the second video block within the target display region.

According to one or more embodiments of the present application, [Example 2] provides a video processing method, wherein after displaying the second video block within the target display region, the method further comprising:

if a first preset condition is not met, the following steps being performed:

determining the second video block from the video block set according to the video interaction type;

determining the target display region from the region set to be displayed; and displaying the second video block within the target display region, and the first preset condition refers to a condition for stopping determining a second video.

According to one or more embodiments of the present application, [Example 3] provides a video processing method, wherein the video interaction type is a first interaction type, the first video blocks are obtained by splitting the target video in a first split manner, and the region to be displayed is the minimum unit of display regions obtained by splitting the video display region in the first split manner; and determining the target display region from the region set to be displayed comprises:

obtaining first coordinates of a first selected position triggered by a user; and taking the region to be displayed where the first coordinates are located as the target display region.

According to one or more embodiments of the present application, [Example 4] provides a video processing method, wherein there are two regions to be displayed, and taking the region to be displayed where the first coordinates are located as the target display region comprises:
   obtaining position coordinates of each of the regions to be displayed in the region set to be displayed;
   determining a distance of the first coordinates from each of the regions to be displayed, separately, based on the first coordinates and the position coordinates of each of the regions to be displayed; and
   taking the region to be displayed with a minimum distance from the first coordinates as the target display region.

According to one or more embodiments of the present application, [Example 5] provides a video processing method, wherein the video interaction type is the first interaction type, and determining the second video block from the video block set according to the video interaction type comprises:
   selecting any one of the first video blocks as the second video block from the video block set according to the first interaction type.

According to one or more embodiments of the present application, [Example 6] provides a video processing method, wherein the video interaction type is the first interaction type, and the method further comprises:
   if the target display region is an occupied display region, repeatedly performing determining the target display region in the region set to be displayed until the target display region that is determined is capable of displaying the second video block or a second preset condition is met, wherein the occupied display region has a corresponding displayed video block.

According to one or more embodiments of the present application, [Example 7] provides a video processing method, wherein the video interaction type is a second interaction type, the first video blocks are video blocks obtained by uniformly splitting the target video in an n-row m-column split manner, wherein n and m are positive integers, m is greater than 1, and a product of n and m is the target number;
   the region to be displayed is a minimum unit of display regions obtained by splitting a video interactive display region in a second split manner, the second split manner is uniform split into n rows or uniform split into m columns, the video interactive display region belongs to the video display region; and
   determining the target display region from the region set to be displayed comprises:
   if a second selected position triggered by a user is detected, obtaining second coordinates of the second selected position; and determining the region to be displayed where the second coordinates are located as the target display region; and
   if the second selected position triggered by the user is not detected, determining the target display region based on a current display region of the second video block, or selecting any region to be displayed from the region set to be displayed as the target display region.

According to one or more embodiments of the present application, [Example 8] provides a video processing method, wherein displaying the second video block within the target display region comprises:
   repeatedly performing moving the current display region of the second video block, by a target step size, in a target direction within the target display region, and displaying the second video block within the current display region until the target display region is redetermined or a third preset condition is met, wherein the current display region is a display region occupied by displaying the second video block, and the current display region is smaller than the target display region.

According to one or more embodiments of the present application, [Example as soon as] provides a video processing method, wherein the second split manner is uniform split into n rows, and determining the second video block from the video block set according to the video interaction type comprises:
   repeatedly performing the following steps until a fourth preset condition is met:
   selecting any one of first video block as the second video block from the first video blocks in an m-th column in the target direction according to the second interaction type;
   deleting the second video block from the video block set; and
   when the first video blocks of the m-th column in the target direction are all selected as the second video block, subtracting 1 from m.

According to one or more embodiments of the present application, [Example 10] provides a video processing method, wherein the second split manner is uniform split into m columns, and determining the second video block from the video block set according to the video interaction type comprises:
   repeatedly performing the following steps until a fifth preset condition is met:
   selecting any one of first video block as the second video block from the first video blocks in the n-th row in the target direction according to the second interaction type;
   deleting the second video block from the first video blocks; and
   when the first video blocks of the n-th row in a vertical downward direction are selected as the second video blocks, subtracting 1 from n.

According to one or more embodiments of the present application, [Example 11] provides a video processing method, wherein the video interaction type is a third interaction type, and the first video blocks are obtained by splitting the target video in a third split manner which is uniform split into p rows and q columns, wherein p and q are positive integers, and a product of p and q is the target number;
   the starting display region is a minimum unit of display regions obtained by splitting the video display region in the third split manner, a number of the starting display region is a preset number which is less than or equal to the target number, and the region to be displayed is a minimum unit of display regions obtained by splitting the video display region in the third split manner; and
   determining the second video block from the video block set according to the video interaction type comprises:
   randomly selecting the preset number of first video blocks as third video blocks from the video block set according to the third interaction type;
   displaying the third video blocks within the starting display region, wherein the starting display region corresponds one-to-one with the third video blocks;
   obtaining a video block selection instruction triggered by the user; and
   determining the second video block from the third video blocks based on the video block selection instruction.

According to one or more embodiments of the present application, [Example 12] provides a video processing method, wherein displaying the second video block within the target display region comprises:

if the target display region is adjacent to a current display region of the second video block, displaying the second video block in the target display region, wherein the current display region is a display region occupied by displaying the second video block.

According to one or more embodiments of the present application, [Example 13] provides a video processing method, wherein the method further comprises:

if the target display region has a fourth video block determined to be displayed, determining a current display region of the second video block as the target display region of the fourth video block; and displaying the fourth video block in the target display region of the fourth video block.

According to one or more embodiments of the present application, [Example 14] provides a video processing method, wherein splitting the target video, based on a display position of the target video, within a video display region to obtain a video block set comprises:

splitting the video display region of the target video to obtain the target number of display sub-regions;

splitting the target video based on the display sub-regions to obtain the target number of first video blocks, wherein the first video blocks are videos displayed in the corresponding display sub-regions; and combining the target number of first video blocks into the video block set.

According to one or more embodiments of the present application, [Example 15] provides a video processing method, wherein the method further comprises:

performing texture sampling on a preset texture using a vertex shader according to the target number to obtain a target texture;

determining the target texture as an output of the vertex shader; and adjusting a display style of the first video blocks using the vertex shader.

According to one or more embodiments of the present application, [Example 16] provides a video processing apparatus, comprising:

an obtaining unit, configured to obtain a target video;

a split unit, configured to split the target video, based on a display position of the target video, within a video display region to obtain a video block set, wherein the video block set comprises a target number of first video blocks, the target number is at least two, and the video display region is a display region displaying the target video;

a first determination unit, configured to determine a second video block from the video block set according to a video interaction type, wherein the second video block is displayed in a starting display region, and the starting display region belongs to the video display region;

a second determination unit, configured to determine a target display region from a region set to be displayed, wherein the region set to be displayed comprises one or more regions to be displayed, and the region to be displayed belongs to the video display region and is a minimum unit of a display region for displaying the second video block; and a first display unit, configured to display the second video block within the target display region.

According to one or more embodiments of the present application, [Example 17] provides a video processing apparatus, the apparatus further comprises:

A first performing unit, configured to, if a first preset condition is not met, the following steps are performed:

determining a second video block from the video block set according to the video interaction type;

determining the target display region from the region set to be displayed; and displaying the second video block within the target display region, and the first preset condition refers to a condition for stopping determining a second video.

According to one or more embodiments of the present application, [Example 18] provides a video processing apparatus, wherein the video interaction type is a first interaction type, the first video blocks are obtained by splitting the target video in a first split manner, and the region to be displayed is the minimum unit of display regions obtained by splitting the video display region in the first split manner; and the second determination unit comprises:

a first obtaining sub-unit, configured to obtain first coordinates of a first selected position triggered by a user;

a first determination sub-unit, configured to take the region to be displayed where the first coordinates are located as the target display region.

According to one or more embodiments of the present application, [Example 19] provides a video processing apparatus, wherein there are two regions to be displayed, and the first determination sub-unit is specifically configured to: obtain position coordinates of each of the regions to be displayed in the region set to be displayed; determine a distance of the first coordinates from each of the regions to be displayed, separately, based on the first coordinates and the position coordinates of each of the regions to be displayed; and take the region to be displayed with a minimum distance from the first coordinates as the target display region.

According to one or more embodiments of the present application, [Example 20] provides a video processing apparatus, wherein the first determination unit is specifically configured to select any one of the first video blocks as the second video block from the video block set according to the first interaction type.

According to one or more embodiments of the present application, [Example 21] provides a video processing apparatus, wherein the video interaction type is the first interaction type, and the apparatus further comprises:

a second performing unit, configured to, if the target display region is an occupied display region, repeatedly perform redetermining the target display region in the region set to be displayed until the target display region that is determined is capable of displaying the second video block or a second preset condition is met, wherein the occupied display region has a corresponding displayed video block.

According to one or more embodiments of the present application, [Example 22] provides a video processing apparatus, wherein the video interaction type is a second interaction type, the first video blocks are video blocks obtained by uniformly splitting the target video in an n-row m-column split manner, wherein n and m are positive integers, m is greater than 1, and a product of n and m is the target number;

the region to be displayed is a minimum unit of display regions obtained by splitting a video interactive display region in a second split manner, the second split manner is uniform split into n rows or uniform split into m columns, the video interactive display region belongs to the video display region; and the second performing unit comprises:

a second determination sub-unit, configured to, if a second selected position triggered by a user is detected, obtain second coordinates of the second selected position; and determine the region to be displayed where the second coordinates are located as the target display region; and a second determination sub-unit, configured to, if the second selected position triggered by the user is not detected, determine the target display region based on a current display region of the second video block, or select any region to be displayed from the region set to be displayed as the target display region.

According to one or more embodiments of the present application, [Example 23] provides a video processing apparatus, wherein the first display unit is specifically configured to repeatedly perform moving the current display region of the second video block, by a target step size, in a target direction within the target display region, and display the second video block within the current display region until the target display region is redetermined or a third preset condition is met, wherein the current display region is a display region occupied by displaying the second video block, and the current display region is smaller than the target display region.

According to one or more embodiments of the present application, [Example 24] provides a video processing apparatus, wherein the second split manner is uniform split into n rows, and the first determination unit is specifically configured to repeatedly perform the following steps until a fourth preset condition is met:

selecting any one of first video block as the second video block from the first video blocks in an m-th column in the target direction according to the second interaction type;

deleting the second video block from the video block set; and when the first video blocks of the m-th column in the target direction are all selected as the second video block, subtracting 1 from m.

According to one or more embodiments of the present application, [Example 25] provides a video processing apparatus, wherein the second split manner is uniform split into m columns, and the first determination unit is specifically configured to repeatedly perform the following steps until a fifth preset condition is met:

selecting any one of first video block as the second video block from the first video blocks in an n-th row in the target direction according to the second interaction type;

deleting the second video block from the first video blocks; and when the first video blocks of the n-th row in a vertical downward direction are selected as the second video blocks, subtracting 1 from n.

According to one or more embodiments of the present application, [Example 26] provides a video processing apparatus, wherein the video interaction type is a third interaction type, and the first video blocks are obtained by splitting the target video in a third split manner which is uniform split into p rows and q columns, wherein p and q are positive integers, and a product of p and q is the target number;

the starting display region is a minimum unit of display regions obtained by splitting the video display region in the third split manner, a number of the starting display region is a preset number which is less than or equal to the target number, and the region to be displayed is a minimum unit of display regions obtained by splitting the video display region in the third split manner; and the first determination unit comprises:

a forth determination sub-unit, configured to randomly select the preset number of first video blocks as third video blocks from the video block set according to the third interaction type;

a display sub-unit, configured to display the third video blocks within the starting display region, wherein the starting display region corresponds one-to-one with the third video blocks;

a second obtaining sub-unit, configured to obtain a video block selection instruction triggered by the user; and a fifth determination sub-unit apparatus determine the second video block from the third video blocks based on the video block selection instruction.

According to one or more embodiments of the present application, [Example 27] provides a video processing apparatus, wherein the first display unit is specifically configured to, if the target display region is adjacent to a current display region of the second video block, display the second video block in the target display region, wherein the current display region is a display region occupied by displaying the second video block.

According to one or more embodiments of the present application, [Example 28] provides a video processing apparatus, wherein the apparatus further comprises:

a replacement unit, configured to, if the target display region has a fourth video block determined to be displayed, determining a current display region of the second video block as the target display region of the fourth video block; and a second display unit, configured to display the fourth video block in the target display region of the fourth video block.

According to one or more embodiments of the present application, [Example 29] provides a video processing apparatus, wherein the split unit comprises:

a first splitting sub-unit, configured to split the video display region of the target video to obtain the target number of display sub-regions;

a second splitting sub-unit, configured to split the target video based on the display sub-regions to obtain the target number of first video blocks, wherein the first video blocks are videos displayed in the corresponding display sub-regions; and a combination sub-unit, configured to combine the target number of first video blocks into the video block set.

According to one or more embodiments of the present application, [Example 30] provides a video processing apparatus, wherein the apparatus further comprises:

a sampling unit, configured to perform texture sampling on a preset texture using a vertex shader according to the target number to obtain a target texture;

a setting unit, configured to determine the target texture as an output of the vertex shader; and an adjustment unit, configured to adjust a display style of the first video blocks using the vertex shader.

According to one or more embodiments of the present application, [Example 31] provides an electronic device, comprising:

one or more processors; and a storage unit storing one or more programs, wherein the one or more programs, when executed by the one or more processors, cause the one or more processors to implement the video processing method according to any one of [Example 1] to [Example 15].

According to one or more embodiments of the present application, [Example 31] provides a computer-readable medium, storing a computer program which, when executed by a processor, causes implementing the video processing method according to any one of [Example 1] to [Example 15].

It should be noted that each embodiment in this specification is described in a progressive way, and each embodiment focuses on the differences from other embodiments, so it is only necessary to refer to the same and similar parts between each embodiment. As for the system or device disclosed in the embodiment, because it corresponds to the method disclosed in the embodiment, the description is relatively simple, and the related points can be found in the description of the method part.

It should be understood that in the present application, "at least one (item)" means one or more, and "multiple" means two or more. "and/or" is used to describe the relationship of related objects, indicating that there can be three kinds of relationships. For example, "A and/or B" can indicate that there are only A, only B and both A and B, where A and B can be singular or plural. The character "/" generally indicates that the context object is an OR relationship. "At least one of the following items (items)" or its similar expression refers to any combination of these items, including any combination of single items (items) or plural items (items). For example, at least one of A, B or C can be expressed as: A, B, C, A and B, A and C, B and C, or A and B and C, wherein A, B and C can be single or multiple.

It should also be noted that in this paper, relational terms such as first and second are only used to distinguish one entity or operation from another entity or operation, and do not necessarily require or imply that there is any such actual relationship or order between these entities or operations. Moreover, the terms "including", "including" or any other variation thereof are intended to cover non-exclusive inclusion, so that a process, method, article or equipment including a series of elements comprises not only those elements, but also other elements not explicitly listed or elements inherent to such process, method, article or equipment. Without further restrictions, an element defined by the phrase "including one" does not exclude the existence of other identical elements in the process, method, article or equipment including the element.

The steps of a method or algorithm described in connection with the embodiments disclosed herein may be directly implemented in hardware, a software module executed by a processor, or a combination of the two. The software module can be placed in random access memory (RAM), internal memory, read-only memory (ROM), electrically programmable ROM, electrically erasable programmable ROM, register, hard disk, removable disk, CD-ROM, or any other storage medium known in the technical field.

The foregoing description of the disclosed embodiments enables those skilled in the art to make or use the present application. Many modifications to these embodiments will be obvious to those skilled in the art, and the general principles defined herein can be implemented in other embodiments without departing from the spirit or scope of the present application. Therefore, the present application will not be limited to the embodiments shown herein, but is to be accorded the widest scope consistent with the principles and novel features disclosed herein.

The invention claimed is:

1. A video processing method, comprising:
   obtaining a target video;
   splitting the target video, based on a display position of the target video, within a video display region to obtain a video block set, wherein the video block set comprises a target number of first video blocks, the target number is at least two, and the video display region is a display region displaying the target video;
   determining a second video block from the video block set according to a video interaction type, wherein the second video block is displayed in a starting display region, and the starting display region belongs to the video display region;
   determining a target display region from a region set to be displayed, wherein the region set to be displayed comprises at least one region to be displayed, and the region to be displayed belongs to the video display region and is a minimum unit of a display region for displaying the second video block; and
   displaying the second video block within the target display region.

2. The method according to claim 1, wherein after the displaying the second video block within the target display region, the method further comprises:
   in response to a first preset condition is not met, the following steps being performed:
      determining the second video block from the video block set according to the video interaction type;
      determining the target display region from the region set to be displayed; and
      displaying the second video block within the target display region, and the first preset condition refers to a condition for stopping determining a second video.

3. The method according to claim 1, wherein the video interaction type is a first interaction type, the first video blocks are obtained by splitting the target video in a first split manner, and the region to be displayed is a minimum unit of display regions obtained by splitting the video display region in the first split manner; and
   the determining the target display region from the region set to be displayed comprises:
      obtaining first coordinates of a first selected position triggered by a user; and
      taking the region to be displayed where the first coordinates are located as the target display region.

4. The method according to claim 3, wherein there are two regions to be displayed, and the taking the region to be displayed where the first coordinates are located as the target display region comprises:
   obtaining position coordinates of each of the regions to be displayed in the region set to be displayed;
   determining a distance of the first coordinates from each of the regions to be displayed, separately, based on the first coordinates and the position coordinates of each of the regions to be displayed; and
   taking the region to be displayed with the minimum distance from the first coordinates as the target display region.

5. The method according to claim 1, wherein the video interaction type is a first interaction type, and the determining the second video block from the video block set according to the video interaction type comprises:
   selecting any one of the first video blocks as the second video block from the video block set according to the first interaction type.

6. The method according to claim 1, wherein the video interaction type is a first interaction type, and the method further comprises:

in response to the target display region is an occupied display region, repeatedly performing determining the target display region in the region set to be displayed until the target display region that is determined is capable of displaying the second video block or a second preset condition is met, wherein the occupied display region has a corresponding displayed video block.

7. The method according to claim 1, wherein the video interaction type is a second interaction type, the first video blocks are video blocks obtained by uniformly splitting the target video in an n-row m-column split manner, wherein n and m are positive integers, m is greater than 1, and a product of n and m is the target number;

the region to be displayed is a minimum unit of display regions obtained by splitting a video interactive display region in a second split manner, the second split manner is uniform split into n rows or uniform split into m columns, the video interactive display region belongs to the video display region; and the determining the target display region from the region set to be displayed comprises:

in response to a second selected position triggered by a user is detected, obtaining second coordinates of the second selected position; and determining the region to be displayed where the second coordinates are located as the target display region; and in response to the second selected position triggered by the user is not detected, determining the target display region based on a current display region of the second video block, or selecting any region to be displayed from the region set to be displayed as the target display region.

8. The method according to claim 7, wherein the displaying the second video block within the target display region comprises:

repeatedly performing moving the current display region of the second video block, by a target step size, in a target direction within the target display region, and displaying the second video block within the current display region until the target display region is redetermined or a third preset condition is met, wherein the current display region is a display region occupied by displaying the second video block, and the current display region is smaller than the target display region.

9. The method according to claim 7, wherein the second split manner is uniform split into n rows, and the determining the second video block from the video block set according to the video interaction type comprises:

repeatedly performing following steps until a fourth preset condition is met:

selecting any one of first video block as the second video block from the first video blocks in an m-th column in the target direction according to the second interaction type;

deleting the second video block from the video block set; and when the first video blocks of the m-th column in the target direction are all selected as the second video block, subtracting 1 from m.

10. The method according to claim 7, wherein the second split manner is uniform split into m columns, and the determining the second video block from the video block set according to the video interaction type comprises:

repeatedly performing following steps until a fifth preset condition is met:

selecting any one of first video block as the second video block from the first video blocks in an n-th row in the target direction according to the second interaction type;

deleting the second video block from the first video blocks; and when the first video blocks of the n-th row in a vertical downward direction are selected as the second video blocks, subtracting 1 from n.

11. The method according to claim 1, wherein the video interaction type is a third interaction type, and the first video blocks are obtained by splitting the target video in a third split manner which is uniform split into p rows and q columns, wherein p and q are positive integers, and a product of p and q is the target number;

the starting display region is a minimum unit of display regions obtained by splitting the video display region in the third split manner, a number of the starting display region is a preset number which is less than or equal to the target number, and the region to be displayed is a minimum unit of display regions obtained by splitting the video display region in the third split manner; and the determining the second video block from the video block set according to the video interaction type comprises:

randomly selecting the preset number of first video blocks as third video blocks from the video block set according to the third interaction type;

displaying the third video blocks within the starting display region, wherein the starting display region corresponds one-to-one with the third video blocks;

obtaining a video block selection instruction triggered by the user; and determining the second video block from the third video blocks based on the video block selection instruction.

12. The method according to claim 11, wherein the displaying the second video block within the target display region comprises:

in response to the target display region is adjacent to a current display region of the second video block, displaying the second video block in the target display region, wherein the current display region is a display region occupied by displaying the second video block.

13. The method according to claim 11, wherein the method further comprises:

in response to the target display region has a fourth video block determined to be displayed, determining a current display region of the second video block as the target display region of the fourth video block; and displaying the fourth video block in the target display region of the fourth video block.

14. The method according to claim 1, wherein the splitting the target video based on a display position of the target video within a video display region to obtain a video block set comprises:

splitting the video display region of the target video to obtain the target number of display sub-regions;

splitting the target video based on the display sub-regions to obtain the target number of first video blocks, wherein the first video blocks are videos displayed in the corresponding display sub-regions; and combining the target number of first video blocks into the video block set.

15. The method according to claim 14, wherein the method further comprises:
- performing texture sampling on a preset texture using a vertex shader according to the target number to obtain a target texture;
- determining the target texture as an output of the vertex shader; and
- adjusting a display style of the first video blocks using the vertex shader.

16. An electronic device, comprising:
- one or more processors; and
- a storage unit storing one or more programs,
- wherein the one or more programs, when executed by the one or more processors, cause the one or more processors to implement a video processing method, comprising:
  - obtaining a target video;
  - splitting the target video, based on a display position of the target video, within a video display region to obtain a video block set, wherein the video block set comprises a target number of first video blocks, the target number is at least two, and the video display region is a display region displaying the target video;
  - determining a second video block from the video block set according to a video interaction type, wherein the second video block is displayed in a starting display region, and the starting display region belongs to the video display region;
  - determining a target display region from a region set to be displayed, wherein the region set to be displayed comprises at least one region to be displayed, and the region to be displayed belongs to the video display region and is a minimum unit of a display region for displaying the second video block; and
  - displaying the second video block within the target display region.

17. A non-transitory computer-readable medium, storing a computer program which, when executed by a processor, causes implementing a video processing method comprising:
- obtaining a target video;
- splitting the target video, based on a display position of the target video, within a video display region to obtain a video block set, wherein the video block set comprises a target number of first video blocks, the target number is at least two, and the video display region is a display region displaying the target video;
- determining a second video block from the video block set according to a video interaction type, wherein the second video block is displayed in a starting display region, and the starting display region belongs to the video display region;
- determining a target display region from a region set to be displayed, wherein the region set to be displayed comprises at least one region to be displayed, and the region to be displayed belongs to the video display region and is a minimum unit of a display region for displaying the second video block; and
- displaying the second video block within the target display region.

18. The method according to claim 3, wherein the splitting the target video based on a display position of the target video within a video display region to obtain a video block set comprises:
- splitting the video display region of the target video to obtain the target number of display sub-regions;
- splitting the target video based on the display sub-regions to obtain the target number of first video blocks, wherein the first video blocks are videos displayed in the corresponding display sub-regions; and
- combining the target number of first video blocks into the video block set.

19. The method according to claim 7, wherein the splitting the target video based on a display position of the target video within a video display region to obtain a video block set comprises:
- splitting the video display region of the target video to obtain the target number of display sub-regions;
- splitting the target video based on the display sub-regions to obtain the target number of first video blocks, wherein the first video blocks are videos displayed in the corresponding display sub-regions; and
- combining the target number of first video blocks into the video block set.

20. The method according to claim 11, wherein the splitting the target video based on a display position of the target video within a video display region to obtain a video block set comprises:
- splitting the video display region of the target video to obtain the target number of display sub-regions;
- splitting the target video based on the display sub-regions to obtain the target number of first video blocks, wherein the first video blocks are videos displayed in the corresponding display sub-regions; and
- combining the target number of first video blocks into the video block set.

* * * * *